United States Patent [19]

Shimoiizaka et al.

[11] 4,347,124
[45] Aug. 31, 1982

[54] METHOD AND DEVICE OF SEPARATING MATERIALS OF DIFFERENT DENSITY BY FERROMAGNETIC LIQUID

[75] Inventors: Junzo Shimoiizaka; Toyohisa Fujita, both of Sendai, Japan

[73] Assignee: Nittetsu Mining Co., Ltd., Japan

[21] Appl. No.: 254,765

[22] Filed: Apr. 16, 1981

[30] Foreign Application Priority Data

Jun. 24, 1980 [JP] Japan .................................. 55-84573

[51] Int. Cl.³ .............................................. B03B 5/36
[52] U.S. Cl. ...................................... 209/1; 209/172.5
[58] Field of Search ........................ 209/1, 172.5, 172; 335/302

[56] References Cited

U.S. PATENT DOCUMENTS

| | | | |
|---|---|---|---|
| 3,483,969 | 12/1969 | Rosensweig | 209/1 |
| 3,788,465 | 1/1974 | Reimers et al. | 209/1 |
| 4,062,765 | 12/1977 | Fay et al. | 209/1 |
| 4,187,444 | 2/1980 | Gerard | 335/302 X |

*Primary Examiner*—Ralph J. Hill
*Attorney, Agent, or Firm*—McGlew and Tuttle

[57] ABSTRACT

Method and device of separating materials of different density by ferromagnetic liquid, using the separation zone formed by a set of magnets disposed so as to form a V-shaped gutter with both of the pole faces thereof. Objects to be separate are moved crosswise to the gutter by forming the separation zone extending in the range of the opening portion of the V-shaped gutter in such a manner that the separation zone is sloping in a plane across the gutter. This permits separation of materials of larger size in comparison with prior methods. The device is suitable for separating materials having larger size such as scraps of automobile containing aluminum and its alloys having a relatively large size and adapted to be separated from other heavy materials such as copper, zinc and their alloys.

3 Claims, 6 Drawing Figures

METHOD AND DEVICE OF SEPARATING MATERIALS OF DIFFERENT DENSITY BY FERROMAGNETIC LIQUID

BACKGROUND OF THE INVENTION

1. Field of the Invention

This invention relates to a method and its device for separating non-magnetic solid objects of different density through the use of a separating zone formed by local variance of magnetic buoyancy which is generated in a ferromagnetic liquid. The liquid occupies a magnetic field generated by a set of magnets disposed so as to form a V-shaped gutter, with both of the pole faces of the magnets confronting each other.

2. Description of the Prior Art

In this specification, a ferromagnetic liquid is defined as a colloidal suspension in which magnetic particles, such as extremely minute particles of magnetite, are stably dispersed, and do not cause local variance of density in the suspension, even in a magnetic field. The liquid thus seemingly functions as if it were magnetic.

If this ferromagnetic liquid is placed in a field having a local field $H$ and a gradient of magnetic field $dH/dx$, a force of $\overline{M}/4\pi \cdot dH/dx$ operates toward a high local field, wherein $\overline{M}$ is magnetization (gauss) of the ferromagnetic liquid in the local field $H$. When a non-magnetic solid object having a volume $V$ is put in this ferromagnetic liquid, this solid object experiences a force of $(-) V \cdot \overline{M}/4\pi \cdot dH/dx$ toward the low local field. This force is what is called "magnetic buoyancy" or the "magnetic levitation force", and $M$ is an average magnetization of the liquid displaced by the solid object.

Recently, the use of this magnetic buoyancy for the purpose of separating such solid objects, has been attempted in some countries of the world, and a device for separating materials of high density has been developed, although this process was previously difficult.

The magnetic field used in this device is easily formed by disposing magnets 1, 1' so as to form a V-shaped gutter with both of the pole faces of the magnets confronting each other as shown in FIG. 1. By providing, in the magnetic field thus formed, a ferromagnetic liquid 2, magnetic buoyancy is obtained. However, the magnitude of the gradient of the magnetic field varies according to the location, bringing about a local variance of magnetic buoyancy. Thus, equibuoyancy contours 3 are obtained between magnet 1 and 1' and thereabove, as shown in FIG. 1. There are two equibuoyancy contours of 3 g/cm³ one each above and below, a mid-area of the gutter, with buoyancy between them which is almost constant. Outside this range or layer 4, either above it or below it, the buoyancy suddenly decreases. Accordingly, a solid object 5, having specific gravity less than 3 g/cm³, is slowly put into this ferromagnetic liquid from above; the solid object 5 floats on layer 4 bounded by the two equibuoyancy contours of 3 g/cm³. If a solid object 6 which is much heavier than 3 g/cm³ is put into the liquid, this object drops in the ferromagnetic liquid 2 through the layer 4. Therefore, this layer 4 is called a separation zone, and is used for the separation of materials of different density.

If this separation zone is sloped, a non-magnetic solid object of less density floating on the separation zone moves in the ferromagnetic liquid along the sloped surface of the separation zone, in a similar way that a child slides down a slide, until it submerges in a portion where the magnitude of the gradient of the magnetic field and buoyancy reduce.

Conventionally, most of the methods and devices of separating materials of different density based on this principle have been in such way that the V-shaped gutter, formed with pole faces of a pair of magnets confronting each other, is sloped longitudinally. A container which is filled with ferromagnetic liquid is installed in the V-shaped gutter, and forms a separation zone sloped longitudinally along which materials of different density flow and separate by either floating or submerging in the separation zone. These cases are shown for instance in Japanese Patent Application No. Sho-51-48894 and Japanese Laid Open Patent Application No. Sho-52-108565.

The important characteristic of these separators is that non-magnetic materials are separated across the magnetic flux lines.

Furthermore, as a special method and device of separating materials of different density by means of ferromagnetic liquid, another method and device have been used as shown in FIG. 2 and in Japanese Laid Open Patent Application No. Sho-54-48379. In such devices, a separation container 8 containing ferromagnetic liquid 2 and with a partition 7 is provided. A magnet 1 is moved under the container and as the relative positions of the magnet 1 and partition 7 vary, the magnet 1 is reciprocated between both sides of the container. In this way, a distribution of equibuoyancy contours 3 in the separation container 8 varies, floating objects of less density crossing over the partition 7, then sinking them, thus separating materials on both sides of the partition 7. The important characteristic of the separator is that non-magnetic materials are separated parallel to the magnetic flux lines.

Both of the above-mentioned methods and devices permit accurate separation, compared with a conventional usual separation method, however, as the maximum size of a particle of the separation object increases difficulty in practicing either method arises. That is, in the leading device of FIG. 1, a separation zone is set up only between magnets 1 and 1', therefore, the interval between the magnets at the level of the separation zone of a certain magnetic buoyancy determines the maximum size of the particle which can be accepted. The size of scrapped solid materials such as aluminum splinters from scrapped automobiles is shown in Table 1 below for example. Many pieces may have a length of 45 mm to 200 mm, and so it is necessary to re-crush such materials in order to separate them using the FIG. 1 device.

TABLE 1

| An Example of Size Distribution of Automobile Scraps | | | | |
|---|---|---|---|---|
| | Magnetic Objects Fe, etc. | Non-magnetic Objects | | |
| Size | | Al & Al Alloy (%) | Cu & Cu Alloy (%) | Zn Alloy (%) | Plastics |
| −25.4 ~ +9.5 mm | 1.4 | 35.9 | 0.9 | 1.1 | 1.0 |
| −44.4 ~ +25.4 mm | 4.6 | 34.9 | 0.4 | 0.0 | 0.0 |
| −200 ~ +44.4 mm | 6.8 | 12.3 | 0.6 | 0.0 | 0.0 |

The above table indicates one example of size distribution from scrapped nonferrous metals of automobiles obtained at random from scrap dealers by the inventors.

Moreover, in the device of FIG. 2 since the portion where a locally non-uniform magnetic field extends is used as the separation zone, which has the partition therein, this device is not applicable to objects other than those having a size of 2.5 to 3.5 mesh or so.

OBJECTS & SUMMARY OF THE INVENTION

It is, therefore, an object of this invention to provide a novel practical device and method which solves difficulties faced by the conventional devices and methods for separating objects of different density by means of ferromagnetic liquid. The invention is based on the result of a study and observation of the distribution of magnetic buoyancy of ferromagnetic liquid in a magnetic field generated by two magnets disposed to confront each other and form a V-shaped gutter in view of the fact that the size of particles of scrapped aluminum of low density are in many cases, as shown above, bigger than those of scrapped copper, copper alloy and zinc alloy of high density and the amount of the former is far larger than the latter.

The method for this purpose comprises, under this invention, the steps of setting up a separation zone extending in the range of the opening portion of a V-shaped gutter in such a manner that the separation zone is sloping in a plane crossing the gutter, supplying non-magnetic solid objects to be separated from the upper portion of the separation zone, dropping the non-magnetic solid objects of high density into the ferromagnetic liquid inside the gutter, floating the non-magnetic solid objects of low density which move down along the upper surface of the sloped separation zone across the gutter, and which drop in the ferromagnetic liquid outside of the area of the magnets.

The preferrable device implementing the above-mentioned process comprises a disposition of the magnets so that their pole faces are against the walls of the V-shaped gutter in a plane crossing the gutter with the gutter slanted, and a container disposed so as to provide continuous space including the spaces inside and above the V-shaped gutter. Above the top of the magnets and outside of the lower side of the opening the slant V-shaped gutter, the container is filled with a ferromagnetic liquid to a proper level above the top of the magnets.

This makes it possible to accurately separate nonmagnetic objects of high density in multi-stages when using a separating device in which plural sets of the magnets each forming a slant V-shaped gutter, are disposed continuously in a side by side manner and the container includes a continuous space including the spaces inside and above the V-shaped gutters, above the top of magnets, and outside of the lower side of the opening of the lowest gutter.

It is one characteristic of the present invention that such multi-stage separation is possible and adapted for accurate separation. In this case, it is favourable to dispose adjacent V-shaped gutters as closely as possible to each other, with inclined guide plate extend over the adjacent magnets in order for floating objects to traverse easily.

As to magnets, permanent magnet such as strontium-ferrite are normally used for this purpose. If, magnets of high magnetization such as samarium-cobalt alloy magnet are used, it is possible to separate non-magnetic solid objects of higher density in multi-stages at the same distance of the magnets. Moreover, it is needless to say that electromagnets are also usable.

Assuming that the direction of the long side of the magnet, parallel to the pole faces, is the longitudinal direction, the method of the present invention may be called a "Cross flow type specific gravity separation method", because the separating process is performed by moving the objects crosswise to the row of magnets, specifically the direction across the pole faces.

As explained above, scrapped aluminum, with particle sizes which are larger than those of other scrapped metals, such as other scraps from automobiles, passes over a set of pole faces and sinks to the bottom of the container outside the magnets, while copper, of smaller size and of smaller quantity and higher density, drops between the magnets. For this reason, this method is fully usable for separation of objects, such as scraps of automobiles according to their specific gravity.

DETAILED DESCRIPTION OF THE PREFERRED EMBODIMENT

Figure 1:
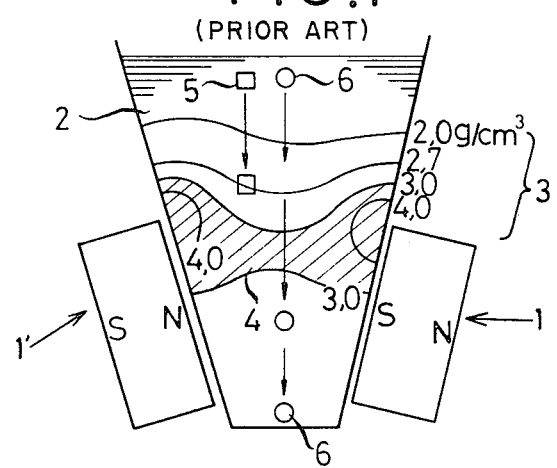
FIG. 1 is a diagrammatic sectional side view of a device which illustrates the prior art principle of separating materials of different density by means of ferromagnetic liquid.
Figure 2:
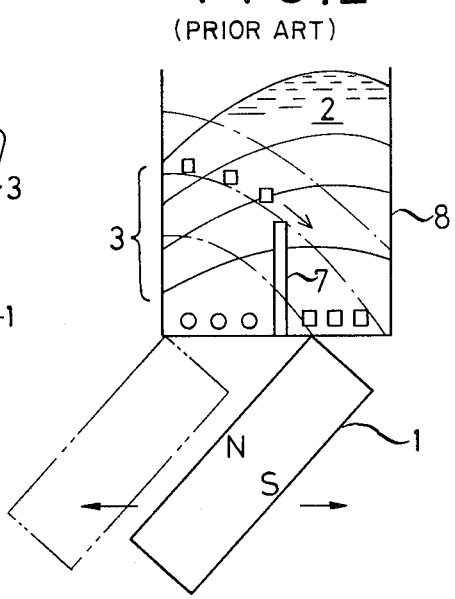
FIG. 2 is a sectional side view of another prior art separator.
Figure 3:
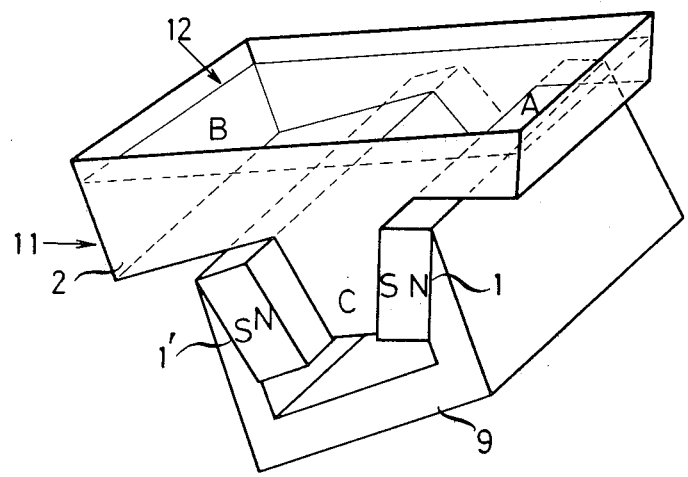
FIG. 3 is a perspective view of an embodiment of the present invention.
Figure 4:
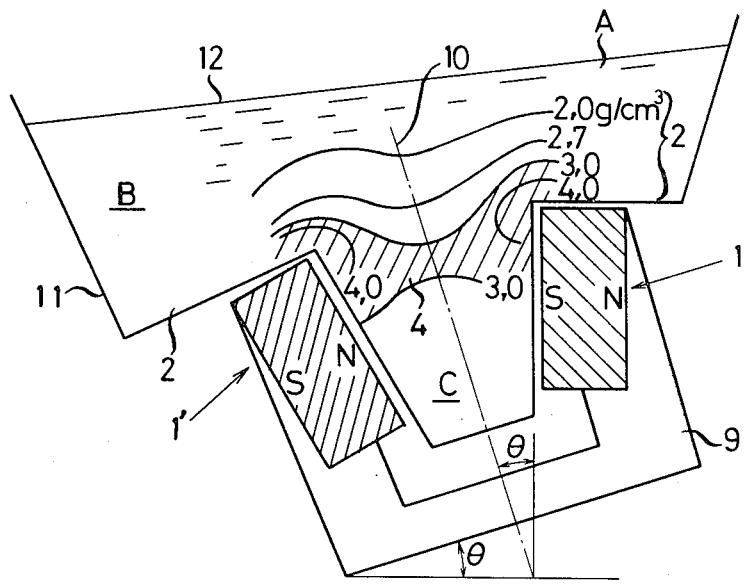
FIG. 4 is a sectional side view of the device of FIG. 3.

In a device of the present invention, as shown in FIG. 3, one set of permanent magnets 1 and 1' connected by yoke 9 at their lower parts are disposed symmetrically on both sides of a plane 10 (FIG. 4) slanting from the vertical plane at an angle $\theta$ in such a manner that the S pole face of magnet 1 and N pole face of magnet 1' confront each other to form the V-shaped gutter. Accordingly, the V-shaped gutter is slanted at an angle $\theta$ in a plane crossing the gutter itself. Space C in the V-shaped gutter formed between magnet 1 and 1' including its upper space, space A above magnet 1, and space B above the top of magnet 1' and its outer space, together comprise a continuous space which is included with container 11, which is filled with ferromagnetic liquid 2 up to a proper level. FIG. 4 shows one example of equibuoyancy contours formed in ferromagnetic liquid 2 inside container 11 where strontium-ferrite permanent magnets are used as the magnets 1 and 1'. As observed in this drawing, the upper surface of separation zone 4 of specific gravity 3 g/cm$^3$, bounded by two equibuoyancy contours 3 g/cm$^3$, lays above the upper edge of the magnet 1, 1'. The surface 12 of the ferromagnetic liquid 2 filled in the container does not become a horizontal plane because of magnetism.

Given below are the method and operation of separating non-magnetic scraps comprising mixtures of aluminum with copper, copper alloy, zinc etc. by the device explained above.

Figure 5:
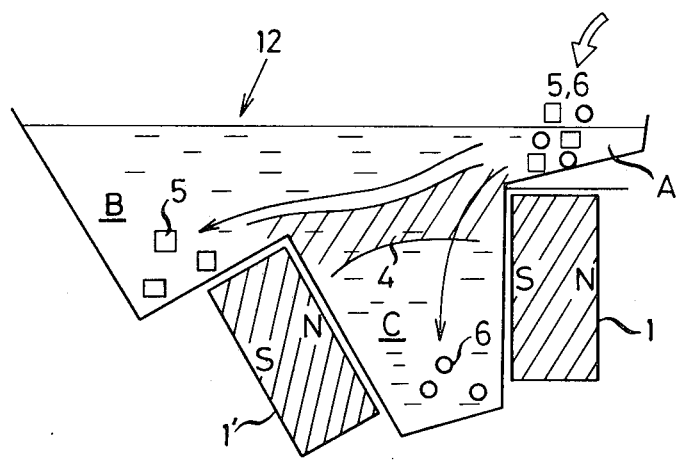
FIG. 5 is a diagrammatic drawing explaining and illustrating the separating operation of the device of FIG. 3.

As shown in FIG. 5, the above-mentioned non-magnetic scrap is supplied obliquely from above into the ferromagnetic liquid 2 at the portion A inside the separation container 11 by a supplying device such as a belt conveyor not shown in the drawing. Scrapped aluminum 5 is symbolically marked with a square mark and non-magnetic scrap 6 of high density such as copper with a circlular mark. Scraps 5 and 6 are led to the separation zone above C along the sloped bottom surface of the portion A of the container above magnet 1. The non-magnetic objects of low density such as scrapped aluminum having specific gravity of 2.7 slide down along the upper equibuoyancy contour of 2.7 g/cm³ shown in FIG. 4 by gravity, passing over the magnet 1' and reach the portion B and settle where magnetic buoyancy scarcely exists. Furthermore, the objects of high density, such as scrapped copper having specific gravity of about 9 and scrapped zinc having specific gravity of about 6.5, break through the separation zone 4 bounded by upper and lower equibuoyancy contours of 3 g/cm³, submerge in the ferromagnetic liquid, and settle on the bottom of the portion C of the container. Scraps 5 and 6 of different specific gravity separated in portions B and C of the container 11 and setting at the respective places are recovered by the usual method, thus separation process comes to an end.

As the above-mentioned crosswise movement of the materials having low density occurs, based upon their sliding down the equibuoyancy contour caused by natural gravity, it is necessary to determined the angle of slant $\theta$ in such manner that the tangential direction of equibuoyancy contour forming the separation zone may be sloped downwards in the direction from A to B in any part thereof. According to the results of various experiments, in case, for instance, of separating objects high density using of permanent ferrite magnets, the proper angle of slant is 10° to 20°. In case the size of the object is big, $\theta$ is chosen to be bigger.

Given below is the result of separation of scrapped aluminum from non-ferrous metals of automobiles using the device of the present invention.

TABLE 2

Result of Separation of Scrapped Aluminum (−200 ~ +25.4 mm)

| | Quality (%) | | Distribution Rate (%) | | Speed of Supply t/hr | Designated Maximum Buoyancy g/cm³ |
|---|---|---|---|---|---|---|
| | Al & Al Alloy | Zn Alloy | Al & Al Alloy | Zn Alloy | | |
| Floating Object | 100.0 | 0.0 | 100.0 | 0.0 | 5.0 | 3.20 |
| Submerged Object | 0.0 | 100.0 | 0.0 | 100.0 | | |

Wherein Al & Al alloy:Zn alloy = 9:1 (by weight ratio)
specific gravity of Al 2.69
specific gravity of Al alloy 2.74
specific gravity of Zn alloy 6.50

In the following, a device of multi-stage separation which provides the plurality of separation units according to the present invention disposed continuously in side by side manner, is explained.

Figure 6:
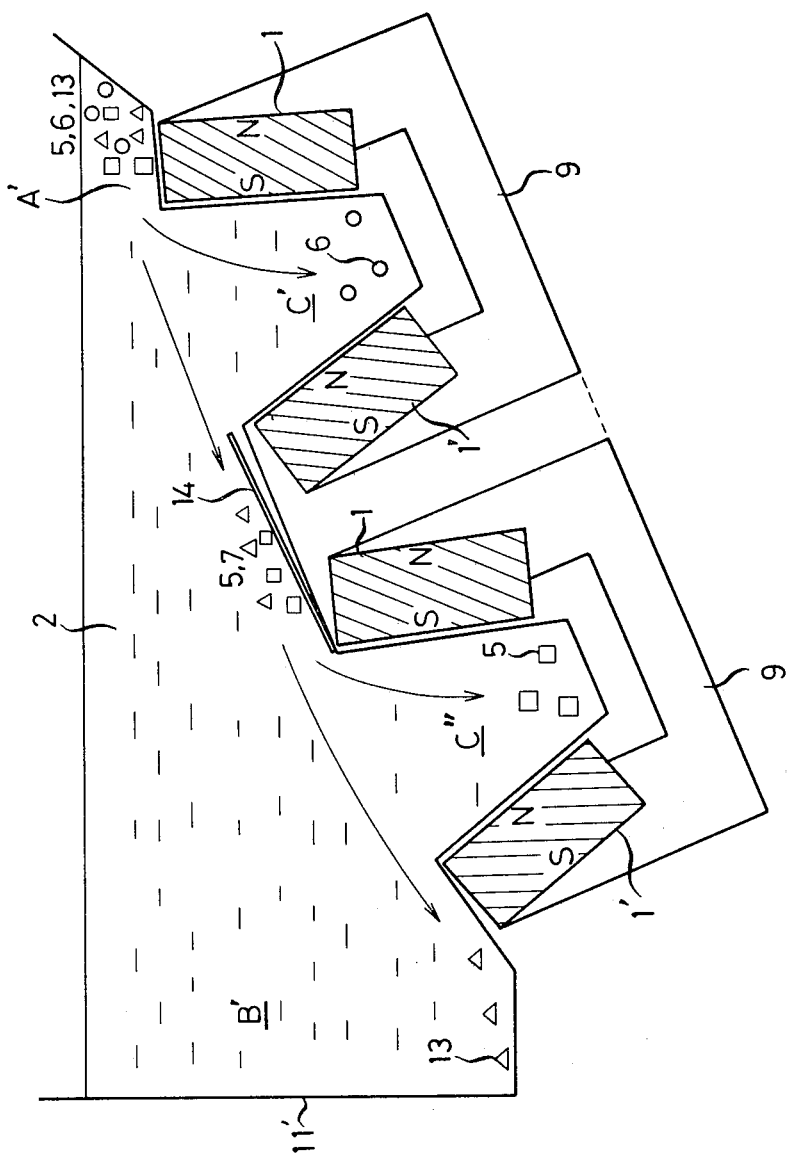
FIG. 6 is a sectional side view of another embodiment of the present invention which separates materials in multi-stages.

In the embodiment shown in FIG. 6, two sets of magnets 1,1' connected by yokes 9 forming a V-shaped gutter are disposed side by side and each of them slant in the plane crossing the gutter. A container 11' is provided which includes a continuous space including the spaces inside and above the V-shaped gutters C', C", above the top of magnets 1, 1', and outside of the opening of the lower gutter C", and this container 11' is filled with ferromagnetic liquid 2 to a proper level. In case, for instance, scrap mixed with copper having specific gravity about 9, aluminum having specific gravity about 2.7 and vinyl chloride the specific gravity below 1.5 is to be separated according to the specific gravity, the separation zone of buoyancy about 3 g/cm³ is formed by the set of magnets 1, 1' at the first stage (gutter C'), and that of buoyancy about 1.5 g/cm³ is also formed by the set of magnets at the second stage (gutter C"). A somewhat inclined guide plate 14 is disposed between the two separation zones which extends over the adjacent magnet 1', 1.

In operation, scrap mixed with copper 6, aluminum 5 and vinyl chloride 13 (the triangles) is put into the portion A' (extreme upstream) of the container 11 obliquely from the upper part thereof by a belt conveyor not shown in the drawing. Then according to the above mentioned principle, in the first separation stage only copper 6 drops through the separation zone designated at specific gravity of 3 g/cm³ and settles on the bottom of portion C', while a mixture of aluminum 5 and vinyl chloride 13 moves toward the second separation stage. As buoyancy at the separation zone of stage 2 is designated at 1.5 g/cm³, aluminum 5 which is heavier than this, drops into C" through the separation zone and settles on its bottom, while only vinyl chloride 13 which is lighter than 1.5 g/cm³ in specific gravity, moves toward the portion B' along the upper surface of the separation zone and settles on the bottom of the portion B'.

What is claimed is:

1. An apparatus for separating nonferromagnetic solids according to specific gravity comprising:
   a vessel having a bottom with upstream and downstream bottom portions which are inclined with respect to the horizontal;
   at least one V-shaped groove defined in said vessel bottom between and below said upstream and downstream bottom portions, having side walls which sre symmetrical about a plane which is inclined with respect to the vertical;
   a magnet with a pole face facing each side wall of said V-shaped groove for establishing a magnetic field thereacross and across said vessel; and
   a ferromagnetic liquid filling said groove and vessel to a selected level above said upstream and downstream bottom portions and wherein equibuoyancy lines of force are established according to said magnetic field, so that with nonferromagnetic solids supplied to said vessel in the vicinity of said upstream bottom portion, solids of greater specific gravity move across said equibuoyancy lines and into said at least one groove and solids of less specific gravity move along said equibuoyancy lines and to the vicinity of said downstream bottom portion.

2. An apparatus according to claim 1, wherein said vessel bottom includes at least one additional further downstream bottom portion, an additional V-shaped groove defined in said vessel bottom between said first mentioned downstream bottom portion and said further downstream bottom portion, said additional groove having side walls which are symmetrical about a plane inclined with respect to the vertical, an additional magnet with a pole face facing each of said side walls of said additional groove.

3. An apparatus according to claim 2, including a guide plate mounted in said vessel over said first mentioned downstream bottom portion, inclined at an angle to the horizontal and at an angle to said first mentioned downstream bottom portion.

\* \* \* \* \*